(12) United States Patent
Xiao et al.

(10) Patent No.: US 11,519,731 B2
(45) Date of Patent: Dec. 6, 2022

(54) PEDESTRIAN ADAPTIVE ZERO-VELOCITY UPDATE POINT SELECTION METHOD BASED ON A NEURAL NETWORK

(71) Applicant: University of Electronic Science and Technology of China, Chengdu (CN)

(72) Inventors: Zhuoling Xiao, Chengdu (CN); Xinguo Yu, Chengdu (CN); Yi He, Chengdu (CN); Bo Yan, Chengdu (CN)

(73) Assignee: UNIVERSITY OF ELECTRONIC SCIENCE AND TECHNOLOGY OF CHINA, Chengdu (CN)

( * ) Notice: Subject to any disclaimer, the term of this patent is extended or adjusted under 35 U.S.C. 154(b) by 352 days.

(21) Appl. No.: 16/816,267

(22) Filed: Mar. 12, 2020

(65) Prior Publication Data
US 2021/0080261 A1 Mar. 18, 2021

(30) Foreign Application Priority Data
Sep. 17, 2019 (CN) .......................... 201910876262.7

(51) Int. Cl.
*G01C 21/18* (2006.01)
*G01C 25/00* (2006.01)
*G06N 3/04* (2006.01)

(52) U.S. Cl.
CPC ........... *G01C 21/18* (2013.01); *G01C 25/005* (2013.01); *G06N 3/0454* (2013.01)

(58) Field of Classification Search
CPC ...... G01C 21/18; G01C 25/005; G01C 21/16; G06N 3/0454; G06N 3/084
See application file for complete search history.

(56) References Cited

U.S. PATENT DOCUMENTS

2019/0150793 A1* 5/2019 Barth .................. A61B 5/7267

OTHER PUBLICATIONS

Wagstaff and Kelly, "LSTM-Based Zero Velocity Detection for Robust Inertial Navigation", 2018 International Conference on Indoor Positioning and Indoor Navigation (Year: 2018).*

* cited by examiner

Primary Examiner — Natalie Huls
Assistant Examiner — Cynthia L Davis
(74) Attorney, Agent, or Firm — Bayramoglu Law Offices LLC (57) ABSTRACT

A pedestrian adaptive zero-velocity update point selection method based on a neural network, including the following steps: S1, collecting inertial navigation data of different pedestrians in different motion modes; S2, preprocessing the inertial navigation data collected in the step S1, labeling the preprocessed data, and obtaining a training data set, a validation data set, and a test data set according to the preprocessed data and a label corresponding to the preprocessed data; S3, inputting the training data set to a convolutional neural network for training, obtaining a pedestrian adaptive zero-velocity update point selection model based on the convolutional neural network, and using the validation data set to validate the pedestrian adaptive zero-velocity update point selection model; and S4, inputting the test data set into the pedestrian adaptive zero-velocity update point selection model based on the convolutional neural network, and obtaining a selection result of pedestrian zero-velocity update points.

5 Claims, 3 Drawing Sheets

PEDESTRIAN ADAPTIVE ZERO-VELOCITY UPDATE POINT SELECTION METHOD BASED ON A NEURAL NETWORK

CROSS REFERENCE TO THE RELATED APPLICATIONS

This application is based upon and claims priority to Chinese Patent Application No. 201910876262.7, filed on Sep. 17, 2019, the entire contents of which are incorporated herein by reference.

TECHNICAL FIELD

The present disclosure belongs to the technical field of pedestrian inertial navigation, and particularly relates to a pedestrian adaptive zero-velocity update point selection method based on a neural network.

BACKGROUND

Currently, platform inertial navigation systems have complex structure, large size, high production cost, and high accuracy. As a result, platform inertial navigation systems are mostly used in aviation, large ships and other fields. Strapdown inertial navigation systems have a simple structure, a small size, light weight, and easy portability. As a result, strapdown inertial navigation systems are mostly used in pedestrian inertial navigation system. The pedestrian inertial navigation system commonly employs an inertial measurement unit (IMU). The inertial measurement unit consists of a three-axis accelerometer and a three-axis gyroscope, which is capable of measuring the step length of the pedestrian and direction. However, random noise and drifting issues of magnitudes of acceleration and angular velocity in the IMU is likely to produce a severe cumulative error due to multiple integrals. The zero-velocity update is an effective method of preventing the increase of the cumulative error and thus is widely adopted.

The concept of the zero-velocity update is as follows. A gait cycle is the process from the time when any one foot touches the ground to when the one foot touches the ground another time during a walking process of a pedestrian. In each gait cycle, the velocity of the foot during the short time interval in which the foot touches the ground and pauses transiently can be considered as zero. The velocity error state vector, the position error state vector, and the attitude error state vector can be obtained in combination with the extended Kalman filtering. The obtained state error vector is transmitted to the inertial navigation system to update the velocity, position and attitude angle. The update is continuously cycled, as the pedestrian continues to walk forward.

In order to accurately obtain various tracks during the motion process of the pedestrian, the zero-velocity update phase must be accurately detected. In the traditional fixed threshold method, the modulus value of the acceleration or the angular velocity, or a sum of weighted modulus values of the acceleration and the angular velocity is taken as the fixed threshold. When the modulus value corresponding to the acceleration or the angular velocity is less than the fixed threshold, the time duration thereof is considered as the zero-velocity update time point. However, since the selection of the fixed threshold is closely related to the motion characteristics of different pedestrians and the motion states (normal speed walking, fast walking, and running) of the pedestrian, the optimal fixed threshold is dynamically changing and needs to be selected by several manual operations, which is time-consuming and arduous, and severely limits the commercial promotion of the pedestrian inertial navigation system. In order to overcome the problems caused by the fixed threshold, some researchers have proposed a dynamic threshold method in which the threshold value is chosen based on different velocities of the pedestrian. However, the dynamic threshold method usually offers a threshold range as well, which is computationally intensive and not accurate, and cannot solve practical issues.

SUMMARY

Detection of the zero-velocity update phase by using the fixed threshold method or the dynamic threshold method of the prior art has certain issues such as, production of large cumulative error, and overall has poor generalization performance. The objective of the present disclosure is to provide a pedestrian adaptive zero-velocity update point selection method based on a neural network.

The technical solution of the present disclosure is as follows. A pedestrian adaptive zero-velocity update point selection method based on a neural network, including the following steps:

S1, collecting inertial navigation data of different pedestrians in different motion modes;

S2, preprocessing the collected inertial navigation data, labeling the preprocessed data at the same time, and obtaining a training data set, a validation data set, and a test data set according to the preprocessed data and a label corresponding to the preprocessed data;

S3, inputting the training data set to a convolutional neural network for training, obtaining a pedestrian adaptive zero-velocity update point selection model based on the convolutional neural network, and using the validation data set to validate the pedestrian adaptive zero-velocity update point selection model;

S4, inputting the test data set into the pedestrian adaptive zero-velocity update point selection model based on the convolutional neural network, and obtaining a selection result of pedestrian zero-velocity update points.

Further, the motion modes in step S1 include normal speed walking, fast walking and running. The inertial navigation data includes angular velocity data collected by a three-axis gyroscope and acceleration data collected by a three-axis accelerometer at each sampling time point.

Further, step S2 includes the following sub-steps:

S21, normalizing the angular velocity data collected by the three-axis gyroscope and the acceleration data collected by the three-axis accelerometer at each sampling time point to obtain a normalized data set;

S22, preprocessing the angular velocity data collected by the three-axis gyroscope at each sampling time point, calculating and obtaining a modulus value of the angular velocity data collected by the three-axis gyroscope at each sampling time point;

S23, according to the modulus value of the angular velocity data collected by the three-axis gyroscope at each sampling time point, using a selection algorithm to label each sampling time point;

S24, using the angular velocity data collected by the three-axis gyroscope, the acceleration data collected by the three-axis accelerometer of 70% sampling time points in the normalized data set, and labels corresponding to the 70% sampling time points as the training data set; using the angular velocity data collected by the three-axis gyroscope, the acceleration data collected by the three-axis accelerometer of 20% sampling time points in the normalized data set and the labels corresponding to the 20% sampling time points as the validation data set; and using the angular velocity data collected by the three-axis gyroscope and the acceleration data collected by the three-axis accelerometer of 10% sampling time points in the normalized data set as the test data set.

Further, step S21 specifically includes:

normalizing the angular velocity data collected by the three-axis gyroscope and the acceleration data collected by the three-axis accelerometer at each sampling point, wherein a formula for the normalization is as follows:

$$z = \frac{x - \text{mean}(x)}{\text{std}(x)}$$

where, x represents angular velocity data or acceleration data to be normalized, z represents normalized angular velocity data or normalized acceleration data, mean(•) represents the mean function, and std(•) represents the standard deviation function;

using the normalized angular velocity data and normalized acceleration data at each sampling time point to form the normalized data set.

Further, the calculation formula of the modulus value of the data collected by the three-axis gyroscope at each sampling time point in step S22 is as follows:

$$\|\text{gyro}_k^b\| = \sqrt{(\omega_{x,k}^b)^2 + (\omega_{y,k}^b)^2 + (\omega_{z,k}^b)^2}$$

where, $\|\text{gyro}_k^b\|$ represents the modulus value of the data collected by the three-axis gyroscope at the $k^{th}$ sampling time point, the superscript b represents a measured value of a vector in a carrier coordinate system, $\omega_{x,k}^b$, $\omega_{y,k}^b$, $\omega_{z,k}^b$ represent angular velocity values of the three-axis gyroscope in the carrier b respectively corresponding to the x-axis, the y-axis, and the z-axis at the $k^{th}$ sampling time point.

Further, step S23 includes the following sub-steps:

S231, setting an optimal fixed threshold $\text{th}_{gyro}$ of the three-axis gyroscope;

S232, using a sampling time point at which the modulus value of the data of the three-axis gyroscope is less than the optimal fixed threshold $\text{th}_{gyro}$ as a potential zero-velocity update point, and marking the potential zero-velocity update point with a red rectangular frame;

S233, according to a modulus value diagram of the data of the three-axis gyroscope, recording a length value L of a number of zero-velocity update points contained in a time point at which a foot of a pedestrian is landed on the ground, wherein an IMU acquisition module is placed in the foot of the pedestrian; according to the length value L, calculating and obtaining an average length L1 of all red rectangular frames;

S234, setting a constant L2<L1, and successively determining whether the length value L of each zero-velocity update point is less than the constant L2, if yes, removing the red rectangle frames marked on the corresponding points, and determining the corresponding points as non-zero-velocity update points, and setting labels of the corresponding points as 0; otherwise, proceeding to step S235;

S235, setting a constant L3<L1 and L3>L2, determining whether the length value L of each zero-velocity update point is less than the constant L3, if yes, proceeding to step S236; otherwise, setting the potential zero-velocity update point corresponding to the red rectangle frame as a zero-velocity update point, and setting a label of the sampling time point corresponding to the potential zero-velocity update point as 1;

S236, setting the potential zero-velocity update point corresponding to the red rectangular frame as an early-warning zero-velocity update point, and marking the early-warning zero-velocity update point with a green rectangular frame;

S237, determining whether the early-warning zero-velocity update point in the green rectangular frame is a zero-velocity update point by a manual inspection, if yes, setting the label of the sampling time point corresponding to the early-warning zero-velocity update point as 1; otherwise, setting the label of the sampling time point corresponding to the early-warning zero-velocity update point as 0.

Further, step S3 includes the following sub-steps:

S31, performing a low-pass filtering operation on the acceleration data and the angular velocity data in the training data set to remove random noises;

S32, sending the acceleration data and the angular velocity data in the training data set to the input layer of the convolutional neural network through two channels, respectively;

S33, extracting features of the data in the input layer through a convolution kernel in a first convolutional layer of the convolutional neural network;

S34, performing a dimension reduction on the feature data extracted by the first convolutional layer through a first pooling layer of the convolutional neural network;

S35, extracting features of the data which is subjected to the dimension reduction of the first pooling layer by a convolution kernel in a second convolutional layer of the convolutional neural network;

S36, performing a dimension reduction on the feature data extracted by the second convolutional layer through a second pooling layer of the convolutional neural network;

S37, inputting the feature data which is subjected to the dimension reduction of the second pooling layer to the fully connected layer of the convolutional neural network to perform an optimal combination on the feature data;

S38, using the data after the optimal combination to pass through a sigmoid activation function to obtain an output of the convolutional neural network, calculating output data and labels corresponding to the output data to obtain an error loss function, using the error loss function to perform backpropagation to update parameters of the convolutional neural network, and obtaining the pedestrian adaptive zero-velocity update point selection model based on the convolutional neural network until an accuracy rate of the training data set and an accuracy rate of the validation data set both satisfy requirements;

S39, inputting data of the validation data set into the pedestrian adaptive zero-velocity update point selection model, predicting to obtain the zero-velocity update point 1 or the non-zero-velocity update point 0, and validating the pedestrian adaptive zero-velocity update point selection model.

The advantages of the present disclosure are as follows. In the present disclosure, the convolutional neural network is applied to the zero-velocity update point selection method, which can adaptively select zero-velocity update points of different pedestrians in different motion states, and exhibits an improvement in the selection accuracy compared with the zero-velocity update point detection method in the prior art. The zero-velocity update and the dead-reckoning motion model are integrated combining the zero-velocity update point selected from the neural network with the extended Kalman filter, which significantly suppresses the increase of the cumulative error, greatly improves the generalization performance of the pedestrian inertial navigation system, and thus possesses the conditions for commercial use.

DETAILED DESCRIPTION OF THE EMBODIMENTS

The illustrative embodiments of the present disclosure will be expressly described hereinafter with reference to the drawings. It should be understood that the embodiments shown and described in the drawings are illustrative only, which are intended to explain the principle and spirit of the present disclosure rather than limiting the scope of the present disclosure.

Figure 1:
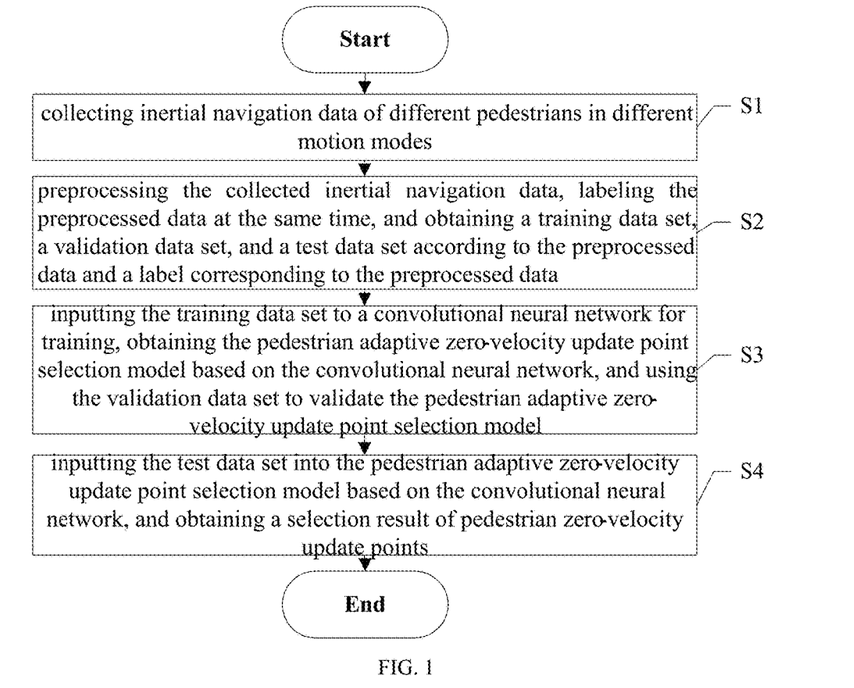
FIG. 1 is a flow chart showing the pedestrian adaptive zero-velocity update point selection method based on the neural network according to an embodiment of the present disclosure.

An embodiment of the present disclosure provides a pedestrian adaptive zero-velocity update point selection method based on a neural network, as shown in FIG. 1, including the following steps S1-S4:

S1, the inertial navigation data of different pedestrians in different motion modes are collected.

The device used in the embodiment of the present disclosure is a new generation inertial measurement unit (NGIMU), and the NGIMU mainly includes a three-axis gyroscope and a three-axis accelerometer. The NGIMU is attached to any foot of the pedestrian, wherein the angular velocity data at each sampling time point is collected by the three-axis gyroscope, and the acceleration data at each sampling time point is collected by the three-axis accelerometer.

In the embodiment of the present disclosure, the motion modes of the pedestrian include normal speed walking (0.4 m/s-1.3 m/s), fast walking (1.3 m/s-2.2 m/s) and running (2.2 m/s-3.2 m/s).

S2, the collected inertial navigation data is preprocessed, and the preprocessed data is labeled at the same time; the training data set, the validation data set, and the test data set are obtained according to the preprocessed data and the label corresponding to the preprocessed data.

Further, step S2 includes the following sub-steps S21-S24:

S21, the angular velocity data collected by the three-axis gyroscope and the acceleration data collected by the three-axis accelerometer at each sampling time point are normalized to obtain the normalized data set.

In the embodiment of the present disclosure, considering that the dimensions of the acceleration data and the angular velocity data are not the same, the acceleration data and the angular velocity data are normalized by using the z-score function in the matrix laboratory (matlab) in order to better extract the corresponding features from the original data, and the specific formula is as follows:

$$z = \frac{x - \text{mean}(x)}{\text{std}(x)}$$

where, x represents angular velocity data or acceleration data to be normalized, z represents the normalized angular velocity data or normalized acceleration data, mean(•) represents the mean function, and std(•) represents the standard deviation function.

The normalized angular velocity data and the normalized acceleration data at each sampling time point are used to form the normalized data set.

S22, the angular velocity data collected by the three-axis gyroscope at each sampling time point is preprocessed, the modulus value of the data of the three-axis gyroscope at each sampling time point is calculated and obtained, and the calculation formula is as follows:

$$\|\text{gyro}_k^b\| = \sqrt{(\omega_{x,k}^b)^2 + (\omega_{y,k}^b)^2 + (\omega_{z,k}^b)^2}$$

where, $\|\text{gyro}_k^b\|$ represents the modulus value of the data of the three-axis gyroscope at the $k^{th}$ sampling time point, the superscript b represents a measured value of a vector in the carrier coordinate system, $\omega_{x,k}^b$, $\omega_{y,k}^b$, $\omega_{z,k}^b$ represent angular velocity values of the three-axis gyroscope in the carrier b respectively corresponding to the x-axis, the y-axis, and the z-axis at the $k^{th}$ sampling time point.

S23, according to the modulus value of the data of the three-axis gyroscope at each sampling time point, the selection algorithm is used to label the each sampling time point.

Step S23 includes the following sub-steps S231-S237:

S231, the optimal fixed threshold $th_{gyro}$ of the three-axis gyroscope is set.

In the embodiment of the present disclosure, the optimal fixed threshold $th_{gyro}$ of the three-axis gyroscope is obtained by multiple experiments and tests according to different pedestrians, different motion attitudes, and different motion states.

Figure 2:
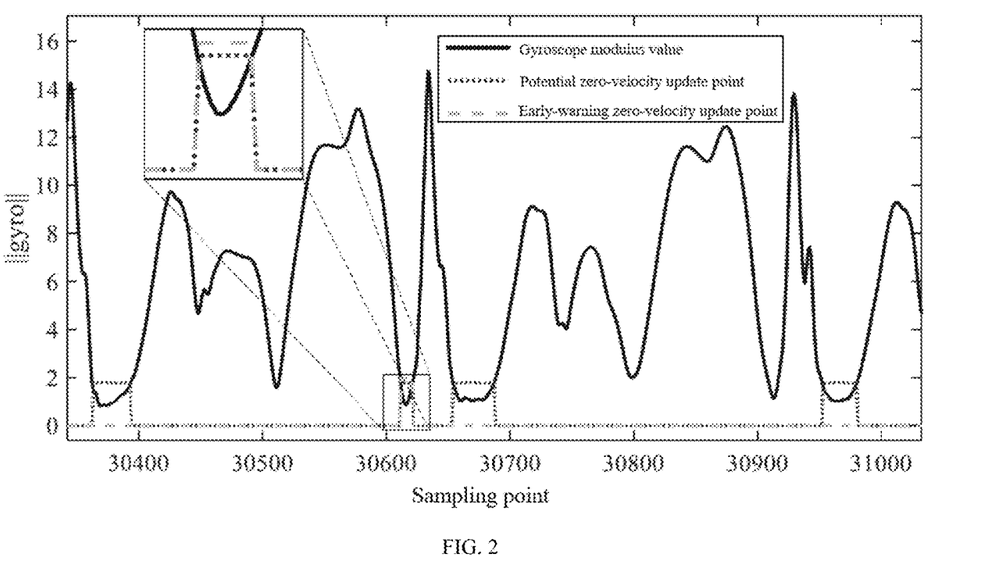
FIG. 2 is a schematic diagram showing the processing of error zero-velocity update points and the processing and analysis of data labels according to an embodiment of the present disclosure.

S232, the sampling time point at which the modulus value of the data of the three-axis gyroscope is less than the optimal fixed threshold $th_{gyro}$ is used as the potential zero-velocity update point, and the potential zero-velocity update point is marked with the red rectangular frame, as shown in FIG. 2.

S233, according to the modulus value diagram (FIG. 2) of the data of the three-axis gyroscope, the length value L of the number of zero-velocity update points contained in the time point at which a foot of the pedestrian is landed on the ground is recorded, wherein the IMU acquisition module is placed in the foot of the pedestrian; according to the length value L, the average length L1 of all the red rectangular frames is calculated and obtained.

S234, setting the constant L2<L1 (L2 is an extremely small constant preset in the embodiment of the present disclosure), and successively determining whether the length value L of each zero-velocity update point is less than the constant L2, if yes, the red rectangle frames marked on the corresponding points are removed, and the corresponding points are determined as non-zero-velocity update points, and the labels of the corresponding points are set as 0; otherwise, proceeding to step S235.

S235, setting a constant L3<L1 and L3>L2, and determining whether the length value L of each zero-velocity update point is less than the constant L3, if yes, proceeding to step S236; otherwise, the potential zero-velocity update point corresponding to the red rectangle frame is set as the zero-velocity update point, and the label of the sampling time point corresponding to the potential zero-velocity update point is set as 1.

In the embodiment of the present disclosure, the values of the constants L2 and L3 need to be selected by multiple tests according to different actual walking tracks.

S236, the potential zero-velocity update point corresponding to the red rectangular frame is set as the early-warning zero-velocity update point, and the early-warning zero-velocity update point is marked with the green rectangular frame, e.g. the sampling points nearby 30600 in FIG. 2.

S237, determining whether the early-warning zero-velocity update point in the green rectangular frame is the zero-velocity update point by the manual inspection, if yes, the label of the sampling time point corresponding to the early-warning zero-velocity update point is set as 1; otherwise, the label of the sampling time point corresponding to the early-warning zero-velocity update point is set as 0.

S24, the angular velocity data collected by the three-axis gyroscope, the acceleration data collected by the three-axis accelerometer of 70% sampling time points in the normalized data set, and the labels corresponding to the 70% sampling time points are used as the training data set; the angular velocity data collected by the three-axis gyroscope, the acceleration data collected by the three-axis accelerometer of 20% sampling time points in the normalized data set and the labels corresponding to the 20% sampling time points are used as the validation data set; and the angular velocity data collected by the three-axis gyroscope and the acceleration data collected by the three-axis accelerometer of 10% sampling time points in the normalized data set are used as the test data set.

In the embodiment of the present disclosure, the data of the training data set, the data of the validation data set, and the data of the test data set must be independently distributed. In consideration of the particularity of the present disclosure, each of the training data set, the validation data set and the test data set must include three types of data respectively in the motion states of normal speed walking, fast walking, and running. In addition, the training data set, the validation data set, and the test data set preferably contain the same amount of data in the three different motion states.

S3, the training data set is input into the convolutional neural network for training, the pedestrian adaptive zero-velocity update point selection model based on the convolutional neural network is obtained, and the validation data set is used to validate the pedestrian adaptive zero-velocity update point selection model.

Step S3 includes the following sub-steps S31-S38:

S31, the low-pass filtering operation is performed on the acceleration data and the angular velocity data in the training data set to remove random noises.

Figure 3:
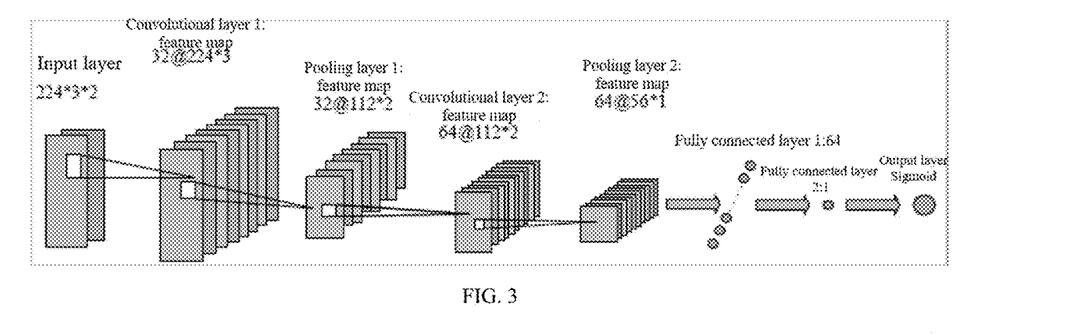
FIG. 3 is a schematic diagram of the convolutional neural network model and related parameters thereof according to an embodiment of the present disclosure.

S32, the acceleration data and the angular velocity data in the training data set are sent to the input layer of the convolutional neural network through two channels, respectively.

In the embodiment of the present disclosure, the convolutional neural network model is shown in FIG. 3, wherein the parameter 224 of the input layer represents 224 sampling time points, 3 represents acceleration data and angular velocity data in three dimensions of x, y, and z, and 2 represents two channels.

S33, features of the data in the input layer are extracted through the convolution kernel in the first convolutional layer of the convolutional neural network.

S34, the dimension reduction is performed on the feature data extracted by the first convolutional layer through the first pooling layer of the convolutional neural network.

S35, features of the data which is subjected to the dimension reduction by the first pooling layer are extracted by the convolution kernel in the second convolutional layer of the convolutional neural network.

S36, the dimension reduction is performed on the feature data extracted by the second convolutional layer through the second pooling layer of the convolutional neural network.

S37, the feature data which is subjected to the dimension reduction of the second pooling layer is input to the fully connected layer of the convolutional neural network to perform an optimal combination on the feature data.

S38, the data which is subjected to the optimal combination is used to pass through a sigmoid activation function to obtain the output of the convolutional neural network, the output data and the labels corresponding to the output data are calculated to obtain an error loss function, the error loss function is used to perform backpropagation to update parameters of the convolutional neural network, and the pedestrian adaptive zero-velocity update point selection model based on the convolutional neural network is obtained until the accuracy rate of the training data set and the accuracy rate of the validation data set both satisfy the requirements.

S39, the data of the validation data set is input into the pedestrian adaptive zero-velocity update point selection model, the zero-velocity update point 1 or the non-zero-velocity update point 0 is predicted and obtained, and the pedestrian adaptive zero-velocity update point selection model is validated.

S4, the test data set is input into the pedestrian adaptive zero-velocity update point selection model based on the convolutional neural network, and the selection result of the pedestrian zero-velocity update points is obtained.

In the embodiment of the present disclosure, a total of 15 walking routes are planned in advance. 35 data collection volunteers perform walking tests at the laboratory building, the scientific research building, the first teaching building, the second teaching building, the running track for track and field athletics, and the running track around the campus in the university in three motion modes of normal speed walking, fast walking, and running, respectively.

Based on the test data of the above-mentioned three different motion modes, the pedestrian adaptive zero-velocity update point selection method based on the neural network provided by the present disclosure is used to select the zero-velocity update points. The selected and obtained zero-velocity update point and non-zero-velocity update point have parameters (accuracy, recall rate, and F1-score value) related to the accuracy which are shown in Table 1.

TABLE 1

| Motion mode | Normal speed walking | | | | Fast walking | | | | Running | | | |
| --- | --- | --- | --- | --- | --- | --- | --- | --- | --- | --- | --- | --- |
| | accuracy | recall rate | F1 | number | accuracy | recall rate | F1 | number | accuracy | recall rate | F1 | number |
| non-zero-velocity update point | 1.00 | 1.00 | 1.00 | 526713 | 1.00 | 0.99 | 0.99 | 634080 | 0.99 | 1.00 | 0.99 | 718120 |
| zero-velocity update point | 0.99 | 1.00 | 0.99 | 299592 | 0.97 | 1.00 | 0.99 | 304422 | 0.99 | 0.93 | 0.96 | 114572 |
| average/total | 1.00 | 1.00 | 1.00 | 826305 | 0.99 | 0.99 | 0.99 | 938502 | 0.99 | 0.99 | 0.99 | 832692 |

Figure 4:
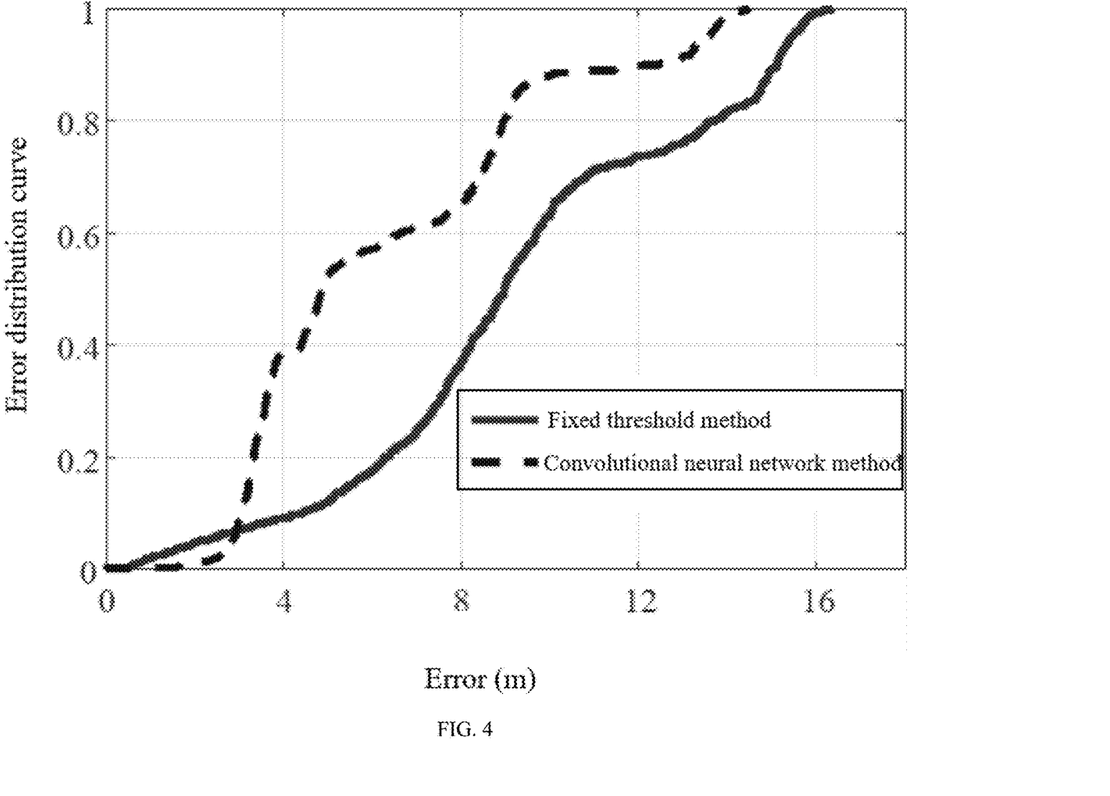
FIG. 4 is a comparison diagram showing the cumulative error distribution curves in actual tests by using the fixed threshold method and the convolutional neural network method in the motion mode of normal speed walking.
Figure 5:
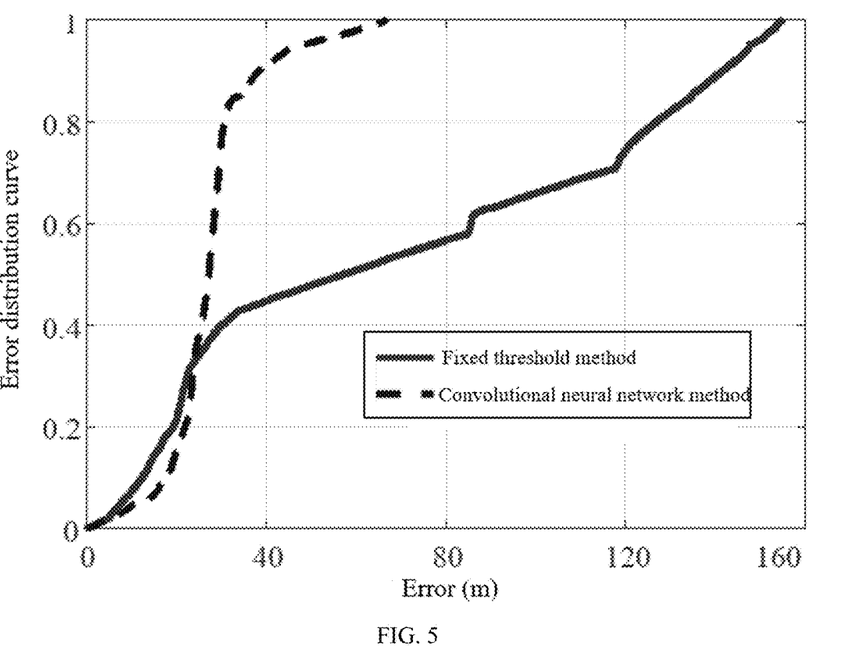
FIG. 5 is a comparison diagram showing the cumulative error distribution curves in actual tests by using the fixed threshold method and the convolutional neural network method in the motion mode of fast walking.
Figure 6:
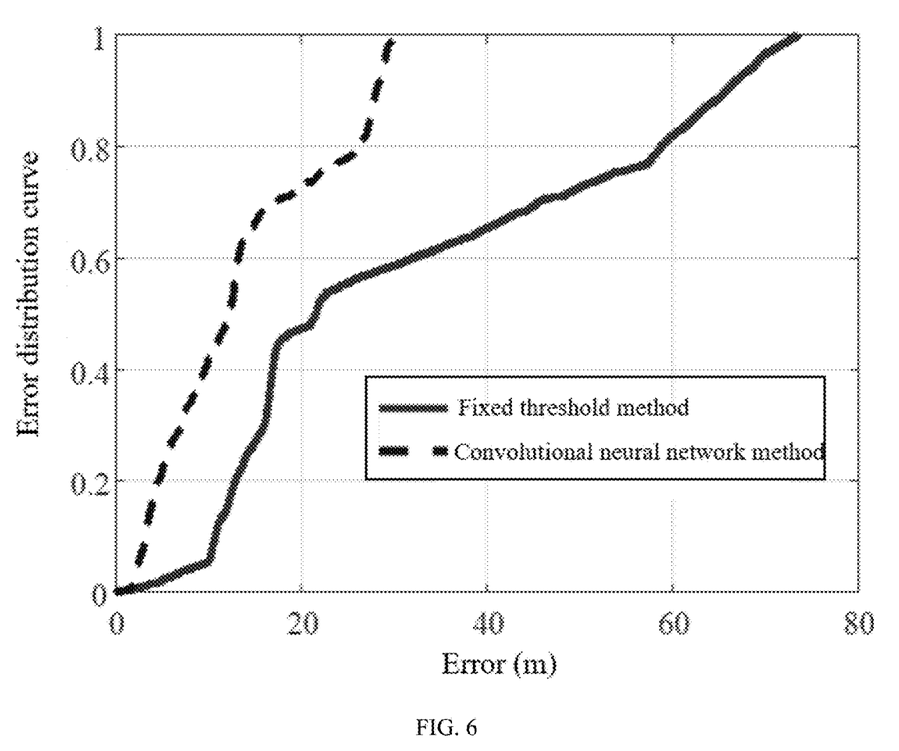
FIG. 6 is a comparison diagram showing the cumulative error distribution curves in actual tests by using the fixed threshold method and the convolutional neural network method in the motion mode of running.

FIGS. 4-6 are comparison diagrams showing the cumulative error distribution curves in actual tests by using the pedestrian adaptive zero-velocity update point selection method based on the neural network provided by the present disclosure and the traditional fixed threshold method in the motion modes of normal speed walking, fast walking, and running, respectively.

With reference to Table 1 and FIGS. 4-6, the pedestrian adaptive zero-velocity update point selection method based on the neural network provided by the present disclosure shows a great improvement in the selection accuracy of the zero-velocity update points compared with the available fixed threshold method in the prior art, and especially in the motion modes of fast walking and running.

According to the cumulative error distribution curve in the motion state of normal walking shown in FIG. 4, the pedestrian adaptive zero-velocity update point selection model trained and obtained by the present disclosure does not greatly improve compared with the fixed threshold method, in that during the normal walking process, the pedestrian usually walks relatively stably without strides, and the feet thereof do not shake dramatically. Therefore, when the pedestrian is walking at a normal speed, the traditional fixed threshold method does not introduce a good deal of false alarm points (non-zero-velocity update points), thus, the traditional fixed threshold method can be used to select zero-velocity update points without producing many errors caused by false alarm points. Therefore, the pedestrian adaptive zero-velocity update point selection model trained and obtained by the present disclosure inherently avoids errors caused by false alarm points, while the improvement thereof under normal walking condition is less significant than that under the fast walking and running conditions compared with the fixed threshold method. Therefore, according to the overall results, the pedestrian adaptive zero-velocity update point selection model trained and obtained by the present disclosure has achieved quite significant effects no matter in the normal speed walking state, the fast walking state or the running state, which significantly improves the positioning effect, greatly enhances the generalization performance, and enables the commercial use of inertial navigation to reach a new level.

The zero-velocity update points selected from the convolutional neural network is combined with the extended Kalman filter to generate the corresponding error state vector, then the error state vector is sent to the dead-reckoning motion model INS, and the position data, the speed data and the attitude data of the pedestrians are regulated by feedback to achieve the integration of the zero-velocity update and the dead-reckoning motion model, which can significantly suppress the increase of the cumulative error in the dead-reckoning motion model.

Those skilled in the art can realize that the embodiments described herein are intended to facilitate readers to understand the principles of the present disclosure, which should be understood that the scope of protection of the present disclosure is not limited to such specific descriptions and embodiments. Those having ordinary skills in the art may make various other specific modifications and combinations without departing from the essence of the present disclosure based on the technical teachings disclosed in the present disclosure, and these modifications and combinations shall fall within the scope of protection of the present disclosure.

What is claimed is:

1. A pedestrian adaptive zero-velocity update point selection method based on a neural network, comprising the following steps:
   S1, collecting inertial navigation data of a plurality of pedestrians in a plurality of motion modes;
   S2, preprocessing the inertial navigation data collected in the step S1 to form preprocessed data, labeling the preprocessed data, and obtaining a training data set, a validation data set, and a test data set according to the preprocessed data and a label corresponding to the preprocessed data;
   S3, inputting the training data set to a convolutional neural network for training, obtaining a pedestrian adaptive zero-velocity update point selection model based on the convolutional neural network, and using the validation data set to validate the pedestrian adaptive zero-velocity update point selection model; and
   S4, inputting the test data set into the pedestrian adaptive zero-velocity update point selection model based on the convolutional neural network, and obtaining a selection result of pedestrian zero-velocity update points;
   wherein, the plurality of motion modes in the step S1 comprise normal speed walking, fast walking, and running;
   wherein the inertial navigation data comprises angular velocity data collected by a three-axis gyroscope and acceleration data collected by a three-axis accelerometer at each sampling time point; and
   wherein, the step S2 comprises the following sub-steps:
   S21, normalizing the angular velocity data collected by the three-axis gyroscope and the acceleration data collected by the three-axis accelerometer at each sampling time point to obtain a normalized data set;
   S22, preprocessing the angular velocity data collected by the three-axis gyroscope at each sampling time point, calculating and obtaining a modulus value of the angular velocity data collected by the three-axis gyroscope at each sampling time point;

S23, according to the modulus value of the angular velocity data collected by the three-axis gyroscope at each sampling time point, using a selection algorithm to label each sampling time point in the normalized data set; and S24, grouping 70% of the labeled sampling time points in the normalized data set as the training data set; grouping 20% of the labeled sampling time points in the normalized data set as the validation data set; and grouping 10% of the labeled sampling time points in the normalized data set as the test data set.

2. The pedestrian adaptive zero-velocity update point selection method according to claim 1, wherein, the step S21 comprises:

normalizing the angular velocity data collected by the three-axis gyroscope and the acceleration data collected by the three-axis accelerometer at each sampling time point, wherein a formula for normalizing the angular velocity data collected by the three-axis gyroscope and the acceleration data collected by the three-axis accelerometer at each sampling time point is as follows:

$$z = \frac{x - \mathrm{mean}(x)}{\mathrm{std}(x)}$$

wherein, x represents angular velocity data to be normalized or acceleration data to be normalized, z represents normalized angular velocity data or normalized acceleration data, mean(•) represents a mean function, and std(•) represents a standard deviation function; and using the normalized angular velocity data and the normalized acceleration data at each sampling time point to form the normalized data set.

3. The pedestrian adaptive zero-velocity update point selection method according to claim UM, wherein, a calculation formula of the modulus value of the angular velocity data collected by the three-axis gyroscope at each sampling time point in the step S22 is as follows:

$$\|\mathrm{gyro}_k^b\| = \sqrt{(\omega_{x,k}^b)^2 + (\omega_{y,k}^b)^2 + (\omega_{z,k}^b)^2}$$

wherein, $\|\mathrm{gyro}_k^b\|$ represents a modulus value of angular velocity data collected by the three-axis gyroscope at a $k^{th}$ sampling time point, the superscript b represents a measured value of a vector in a carrier coordinate system $\omega_{x,k}^b$, $\omega_{y,k}^b$, $\omega_{z,k}^b$ respectively represent a first angular velocity value, a second angular velocity value, and a third angular velocity value of the three-axis gyroscope in a carrier b at the $k^{th}$ sampling time point, wherein the first angular velocity value, the second angular velocity value, and the third angular velocity value respectively correspond to a x-axis, a y-axis, and a z-axis.

4. The pedestrian adaptive zero-velocity update point selection method according to claim 1, wherein, the step S23 comprises the following sub-steps:

S231, setting an optimal fixed threshold $th_{gyro}$ of the three-axis gyroscope;

S232, using a sampling time point as a potential zero-velocity update point, wherein the modulus value of the angular velocity data collected by the three-axis gyroscope is less than the optimal fixed threshold $th_{gyro}$ at the sampling time point; and marking the potential zero-velocity update point with a red rectangular frame;

S233, according to a modulus value diagram of the angular velocity data collected by the three-axis gyroscope, recording a length value L of a number of zero-velocity update points contained in a time point, wherein a foot of a pedestrian is landed on a ground at the time point, and an IMU acquisition module is placed in the foot of the pedestrian; according to the length value L, calculating and obtaining an average length L 1 of all red rectangular frames;

S234, setting a constant L2<L1, and successively determining whether the length value L of each of the zero-velocity update points is less than the constant L2, if the length value L of each of the zero-velocity update points is less than the constant L2, removing red rectangle frames marked on corresponding potential zero-velocity update points, and determining the corresponding potential zero-velocity update points as non-zero-velocity update points, and setting labels of the corresponding potential zero-velocity update points as 0; if the length value L of each of the zero-velocity update points is not less than the constant L2, proceeding to step S235;

S235, setting a constant L3<L1 and L3>L2, determining whether the length value L of each zero-velocity update point is less than the constant L3, if the length value L of each zero-velocity update point is less than the constant L3, proceeding to step S236; if the length value L of each zero-velocity update point is not less than the constant L3, setting the potential zero-velocity update point corresponding to the red rectangle frame as a zero-velocity update point, and setting a label of a sampling time point corresponding to the potential zero-velocity update point as 1;

S236, setting the potential zero-velocity update point corresponding to the red rectangular frame as an early-warning zero-velocity update point, and marking the early-warning zero-velocity update point with a green rectangular frame; and S237, determining whether the early-warning zero-velocity update point in the green rectangular frame is the zero-velocity update point by a manual inspection, if the early-warning zero-velocity update point in the green rectangular frame is the zero-velocity update point, setting a label of a sampling time point corresponding to the early-warning zero-velocity update point as 1; if the early-warning zero-velocity update point in the green rectangular frame is not the zero-velocity update point, setting the label of the sampling time point corresponding to the early-warning zero-velocity update point as 0.

5. The pedestrian adaptive zero-velocity update point selection method according to claim 1, wherein, the step S3 comprises the following sub-steps:

S31, performing a low-pass filtering operation on the acceleration data and the angular velocity data in the training data set to remove random noises;

S32, sending the acceleration data and the angular velocity data in the training data set to an input layer of the convolutional neural network through two channels, respectively;

S33, extracting features of the acceleration data and the angular velocity data in the input layer of the convolutional neural network through a convolution kernel in a first convolutional layer of the convolutional neural network to obtain first feature data;

S34, performing a first dimension reduction on the first feature data through a first pooling layer of the convolutional neural network to obtain second feature data;

S35, extracting features of the second feature data by a convolution kernel in a second convolutional layer of the convolutional neural network to obtain third feature data;

S36, performing a second dimension reduction on the third feature data through a second pooling layer of the convolutional neural network to obtain fourth feature data;

S37, inputting the fourth feature data to a fully connected layer of the convolutional neural network to perform an optimal combination on the fourth feature data to obtain fifth feature data;

S38, using the fifth feature data to pass through a sigmoid activation function to obtain an output of the convolutional neural network, calculating the output and labels corresponding to the output to obtain an error loss function, using the error loss function to perform a backpropagation to update parameters of the convolutional neural network, and obtaining the pedestrian adaptive zero-velocity update point selection model based on the convolutional neural network until an accuracy rate of the training data set and an accuracy rate of the validation data set both satisfy requirements; and S39, inputting data of the validation data set into the pedestrian adaptive zero-velocity update point selection model, predicting to obtain a zero-velocity update point 1 or a non-zero-velocity update point 0, and validating the pedestrian adaptive zero-velocity update point selection model.

* * * * *